US012038358B2

(12) United States Patent
Revie et al.

(10) Patent No.: US 12,038,358 B2
(45) Date of Patent: Jul. 16, 2024

(54) METHOD OF FORMING A STAIN ASSESSMENT TARGET

(71) Applicant: LEEDS TEACHING HOSPITAL NHS TRUST, Leeds (GB)

(72) Inventors: William Craig Revie, Aston Clinton (GB); David Stewart Brettle, Barkisland (GB)

(73) Assignee: LEEDS TEACHING HOSPITALS NHS TRUST, Leeds (GB)

( * ) Notice: Subject to any disclaimer, the term of this patent is extended or adjusted under 35 U.S.C. 154(b) by 0 days.

(21) Appl. No.: 14/658,886

(22) Filed: Mar. 16, 2015

(65) Prior Publication Data

US 2016/0123850 A1   May 5, 2016

(30) Foreign Application Priority Data

Jan. 17, 2014 (GB) .................................. 1400818

(51) Int. Cl.
*G01N 1/30* (2006.01)
*G01N 1/31* (2006.01)
*G01N 21/27* (2006.01)

(52) U.S. Cl.
CPC .............. *G01N 1/30* (2013.01); *G01N 1/312* (2013.01); *G01N 21/278* (2013.01)

(58) Field of Classification Search
CPC ......... G01N 1/30; G01N 21/278; G01N 1/312
See application file for complete search history.

(56) References Cited

U.S. PATENT DOCUMENTS

| 5,109,429 | A | 4/1992 | Bacus et al. |
| 7,057,735 | B2 * | 6/2006 | Jasapara ........... C03B 37/01807 |
| | | | 356/477 |
| 7,695,752 | B2 * | 4/2010 | Bonner ............... G01N 33/543 |
| | | | 356/36 |
| 2003/0166261 | A1 | 9/2003 | Sompuram et al. |
| 2006/0051736 | A1 | 3/2006 | Shields et al. |

FOREIGN PATENT DOCUMENTS

| CN | 103471898 A | 12/2013 |
| WO | 2013/186530 A1 | 12/2013 |

OTHER PUBLICATIONS

Chan et al. Reflections on the Use of Controls in Immunohistochemistry and Proposal for Application of a Multitissue Spring-Roll Control Block; Annals of Diagnostic Pathology, vol. 4, No. 5 pp. 329-336. (Year: 2000).*
Nagajyothi et al. Response of Adipose Tissue to Early Infection With Trypanosoma Cruzi (Nrazil Strain); The Journal of Infectious Diseases, vol. 205, pp. 830-840. (Year: 2012).*
Yagi, Y. Color Standardization and Optimization in Whole Slide Imaging; Diagnostic PAthology, vol. 6, Suppl. 1, pp. 1-12. (Year: 2011).*
Examination Report, dated Dec. 12, 2018, issued by the UK Intellectual Property Office in corresponding application No. GB1400818.9.
UK International Property Office Search Report for corresponding application No. GB1400818.9 dated Jul. 22, 2014.

* cited by examiner

*Primary Examiner* — Jeanette M Lieb
*Assistant Examiner* — Paul C Martin
(74) *Attorney, Agent, or Firm* — Sughrue Mion, PLLC

(57) ABSTRACT

A method is provided of forming a stain assessment target for a biological material staining system. At least one region of a substrate is provided upon a support such as a microscope slide. The substrate is formed from an optically transmissive material which is an analogue of biological tissue. A biological tissue sample for inspection is also provided upon the support. The support, including the at least one region, together with the biological tissue sample and then stained by applying at least one biological tissue stain under similar staining conditions.

17 Claims, 4 Drawing Sheets
(3 of 4 Drawing Sheet(s) Filed in Color)

METHOD OF FORMING A STAIN ASSESSMENT TARGET

FIELD OF THE INVENTION

The present invention relates to a method of forming a stain assessment target for use in assessing a biological material staining system.

BACKGROUND

In histopathology, there are well known methods of examining biological materials such as tissue or cells at microscopic scales. Typical methods used by pathologists for analysing cells involve the preparation of tissue samples by sectioning and staining samples and then examining the stained samples under an optical microscope. Colouring tissue using stains or dyes is a technique commonly used in microscopy to enhance contrast in the microscope image. Different cell types (or cell components) may be combined with stains of different colours so that they can be easily differentiated. This enables diagnosis of abnormalities or diseases for example.

The set of stains in combination with the method of applying these stains to tissue samples on microscope slides are known as staining protocols. The most widely used staining protocol uses haematoxylin and eosin stains ("H&E" staining). The colour produced by each tissue preparation depends on the type of tissue (or cell component), the tissue thickness and the strength of the stain used. The colour intensity depends upon both the tissue thickness and the stain concentration. This difference in staining intensity is important and may influence the diagnostic result a pathologist decides upon.

In modern laboratories it has become common practice to view a sample of cells with a digital camera attached to a microscope or to use a very high resolution scanner to reproduce digitally the appearance of the cells over a larger area. This enables the images to be shared between pathologists without the need for them to be looking down the same microscope at the same sample. A significant problem with this practice, however, is that the colour appearance of the cells has an additional variation added by the colour response of the microscope, digital camera or scanner and the colour monitor or printer being used to view the image, as each of these devices has its own colour response. A means to calibrate and to assess the colour accuracy of these systems is highly desirable.

The present applicant has disclosed improved methods and apparatus relating to the imaging of biological tissue stains in WO2013/186530. There remains a need to provide improved devices, and methods of their production, particularly which can be used to assess the staining level applied to a tissue sample, such as provided upon a digital microscope slide.

It would in principle be possible to use standardised biological tissue samples to address these needs however there are a number of difficulties with this approach:
(a) it is difficult to produce standardised tissue and to produce sections of standard thickness,
(b) stained tissue samples exhibit significant variation in colour within a cell and this makes it difficult to obtain regions of uniform colour of a size that can be measured and
(c) tissue samples degrade with time resulting in significant colour shifts.

There is therefore a need to identify a non-tissue substrate that can be stained to produce the same colours as biological tissue samples and which may be used to provide an objective means to assess the staining level of each microscope slide.

SUMMARY OF THE INVENTION

In accordance with a first aspect of the present invention we provide a method of forming a stain assessment target for a biological material staining system, the method comprising:
    providing at least one region of a substrate upon a support (for example a microscope slide), the substrate being formed from an optically transmissive material which is an analogue of biological tissue;
    providing a biological tissue sample upon the support; and,
    applying at least one biological tissue stain to each of the at least one region and the biological tissue sample under similar staining conditions.

We have identified a number of non-tissue substrate materials which can be used as a biological tissue analogue. Such materials are a tissue analogue in the sense that they absorb and retain biological tissue stains in a similar sense to biological tissue. Preferably these materials are manufactured analogues which allows the process by which they are formed to be carefully controlled, this in turn providing the substrates with accurately controlled properties. Such materials include, but are not limited to Cellophane®, cellulose, agar, agarose and gelatine, that can be used as an effective substrate for pathology stains.

We have realised that such substrate material can be applied to microscope slides together with a tissue sample of interest, before staining, to allow digital microscope systems to assess the level of staining applied to the tissue samples. The at least one region of substrate is subjected to similar staining conditions as the tissue sample. In principle the one or more biological tissue stains may be applied by localised controlled application to a surface of each region (as well as the tissue sample). However, it is preferred that the application of the at least one biological tissue stain may be achieved under similar staining conditions using the staining protocol in the usual way. This ensures that the staining of the tissue itself is performed using a technique which is as close as possible to well established techniques of applying staining protocols.

By using a number of regions of substrate, further information may be obtained which may then be used in improved comparisons between tissue samples stained and imaged under different conditions, such as by different laboratories. The regions therefore act as an "on slide" reference or calibration device since they undergo similar staining conditions to the tissue sample of interest.

Typically such materials from which the substrate is formed are manufactured polymers. They are preferably provided in the form of a film, for example each region may be provided as an independent piece of film which is attached to the support. It is preferred that such a film is self-supporting to enable ease of processing. Films are useful since they are typically produced with a reliably uniform thickness and are sufficiently thing to provide low attenuation of light when in an unstained state. The stains are generally absorbed by the substrate material such that a homogeneous distribution of staining is achieved in the through-thickness direction.

An alternative approach to the attachment of a solid substrate to the support is to provide the substrate in liquid form which then dries in situ to form the solid substrate. For example each region may be deposited on to the support using a fluid-jet printing process. This is advantageous since it avoids the need to handle and attach a solid substrate film. The positioning of each region and its dimensions may be achieved with high accuracy using such a process. However, the resultant microstructure may differ from that of a film. Different thicknesses of substrate may be achieved with such a technique by overprinting previously deposited layers of substrate.

Advantageously, a plurality of regions of the substrate are provided upon the support, each having a different thickness, for example to allow a broad range of staining intensities to be assessed. This may be achieved by the use of different film thicknesses. Typically a range of thicknesses is provided in the regions applied to the target and the thickness of the tissue sample lies within that range.

An alternative to the use of different thicknesses (although conceivably possible to use in combination with thickness modulation) is the use of different regions having modulated stain absorption characteristic. This may be readily achieved in a film-based region by the use of films bearing coatings of different materials or different thicknesses of materials. The absorption characteristic in question may be the diffusion coefficient for the stain in question through the coating material. In the case of a fluid-jet deposition process then absorption may be controlled in principle by modifying the process parameters to control the density of the microstructure of the material or to apply a coating material to the surface of the deposited substrate somewhat analogously to the provision of a coated film.

Whilst the at least one biological tissue stain may comprise a single stains, it is contemplated that two or more different biological tissue stains may be used.

Although the examples described herein are for Haematoxylin and Eosin (H&E) staining, the same techniques can be applied to a wide range of staining protocols including but not limited to the following: Haematoxylin and Eosin (H&E), Diaminobenzidine (DAB) with Haematoxylin counter stain, Papanicolaou (PAP), Perls' Prussian blue, Periodic acid-Schiff (PAS), Reticulin, Millers elastic Van Gieson, Shikata, Giemsa stain, Ziehl Neelsen technique, Grocott, Alcian blue PAS, Jones methenamine silver, Gram, Congo red stain for amyloid and Masson trichrome.

In accordance with a second aspect of the invention we provide a stain assessment target for a biological material staining system, the stain assessment target comprising:
  a support;
  at least one region of a substrate, provided upon the support, the substrate being formed from an optically transmissive material which is an analogue of biological tissue adapted for receipt of at least one biological tissue stain according to a staining protocol; and,
  a biological tissue sample, provided upon the support and adapted for receipt of the at least one biological tissue stain according to the staining protocol.

The support typically takes the form of a microscope slide. Such a support may in practice contain multiple instances of the at least one region, for example a first series of regions having different thicknesses and a second series having different stain absorption characteristics (achieved for example by different surface coatings/treatments). In such cases the two series may each be formed from the same substrate material (such as cellophane). It is also contemplated that different sets of regions formed from different substrate materials may be used.

In accordance with a third aspect of the invention there is provided a stain assessment target produced by the method according to the first aspect of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The patent or application file contains at least one drawing executed in color. Copies of this patent or patent application publication with color drawing(s) will be provided by the Office upon request and payment of the necessary fee.

Figures 1A, 1B, 1C, 1D:
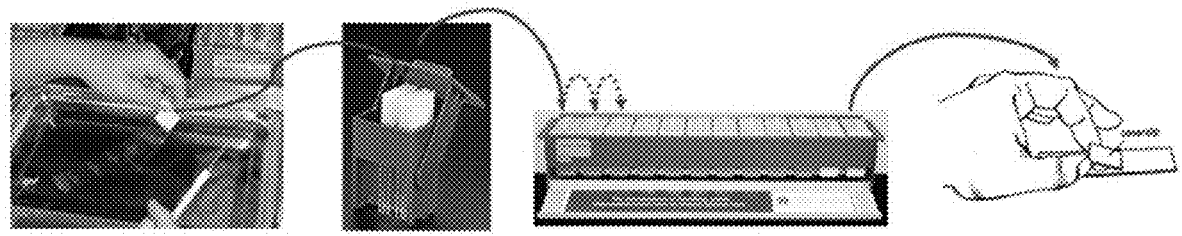
Figure 2:
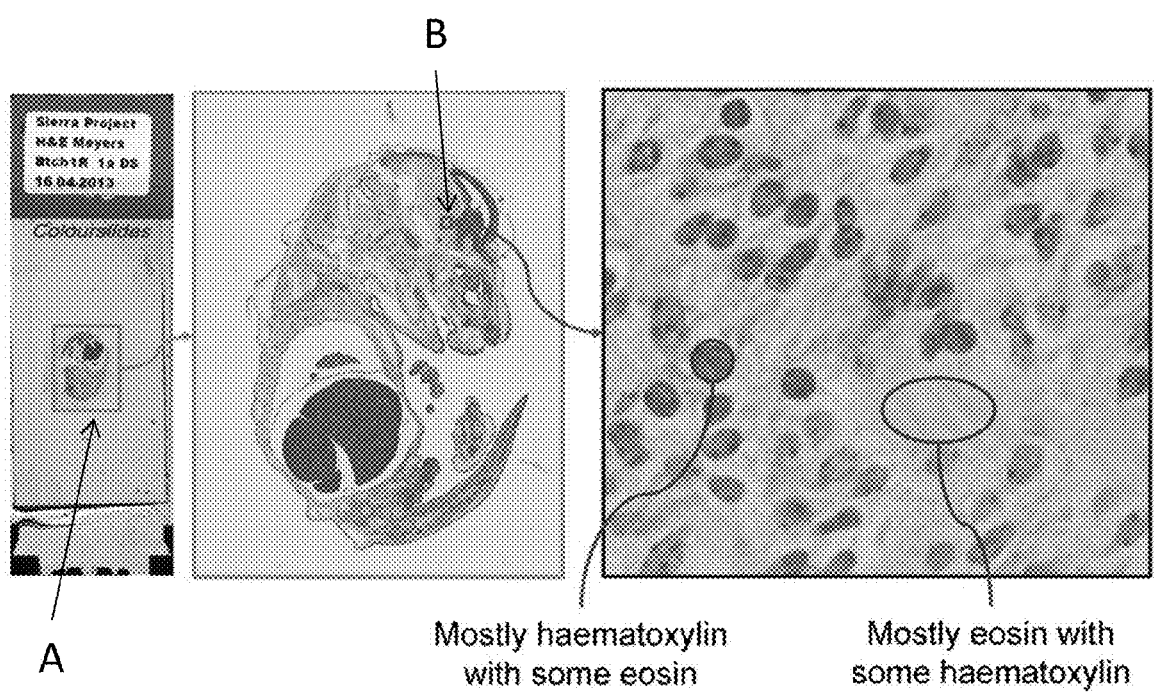
Figure 3:
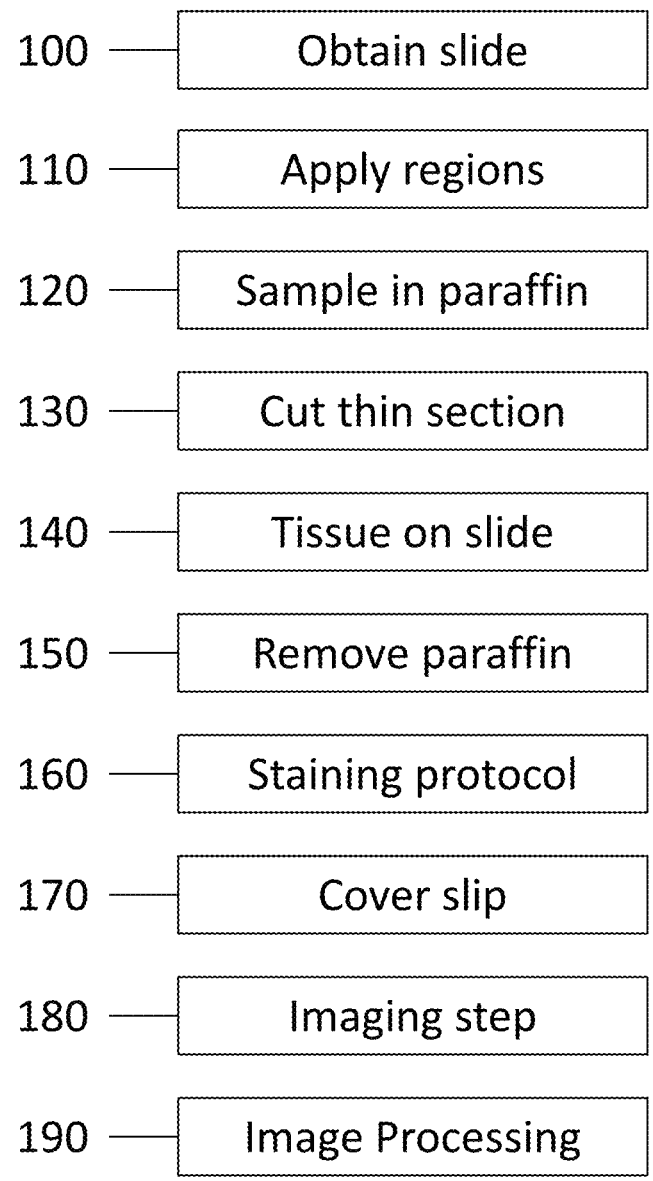
Figure 4:
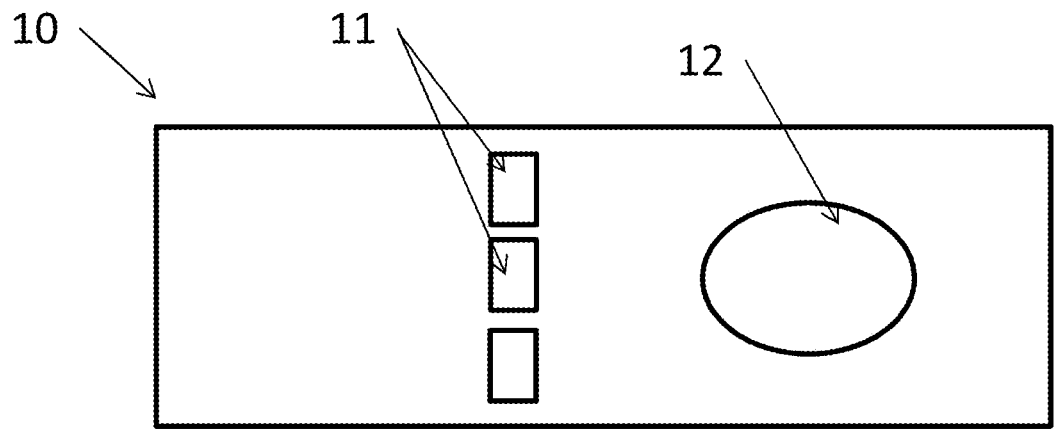
Figure 5:
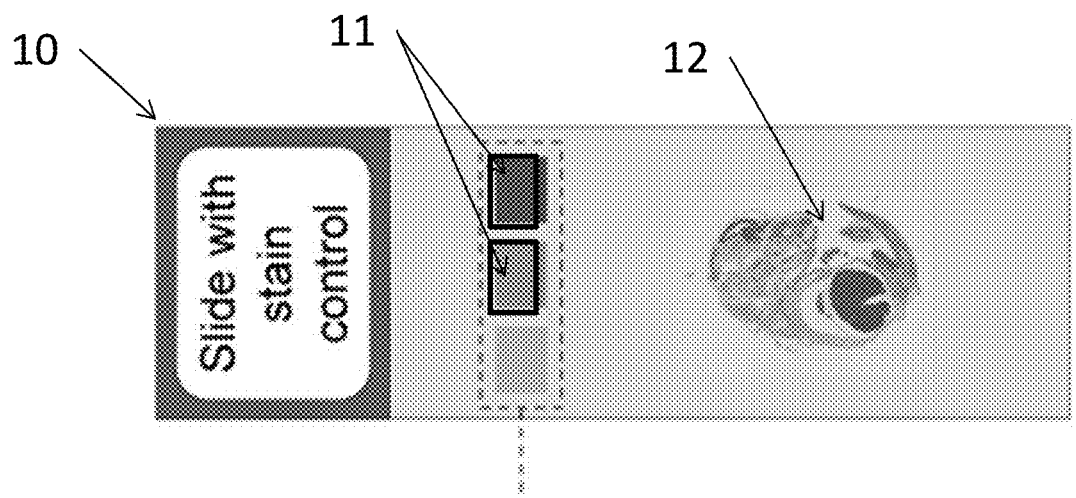
Figure 6:
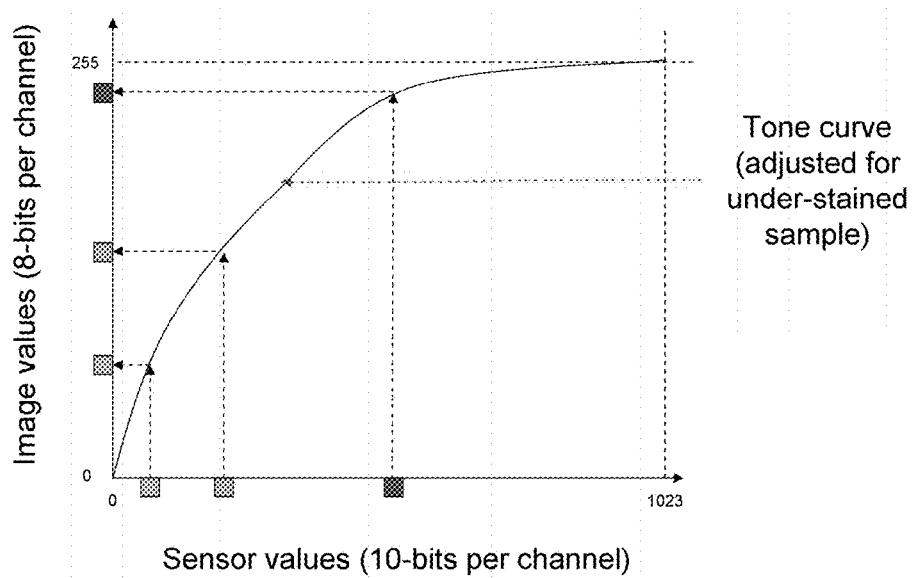
Figure 7:
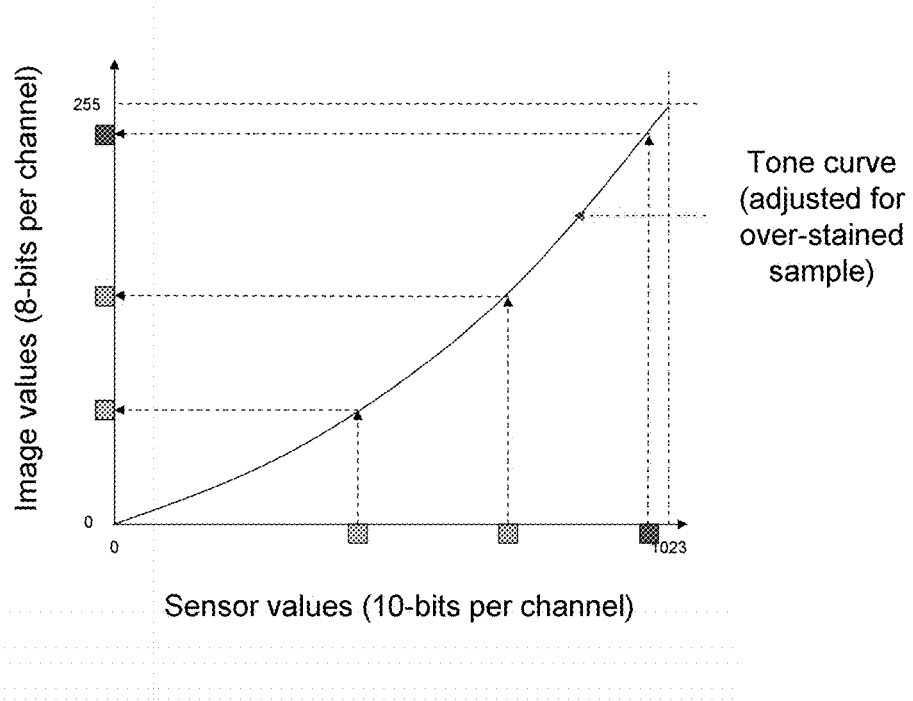

Some examples of the present invention are now described with reference to the accompanying drawings, in which:

FIG. 1a shows a paraffin section containing a tissue sample being floated on to a slide;

FIG. 1b shows the stacking of slides into a holder;

FIG. 1c illustrates the staining of slides using a number of baths;

FIG. 1d illustrates the application of a cover slip;
  a paraffin section containing a tissue sample being floated on to a slide;

FIG. 2 shows a stained tissue sample at three different levels of magnification;

FIG. 3 is a flow diagram of a first example method;

FIG. 4 is a schematic representation of regions of applied substrate together with a tissue sample as applied to a slide;

FIG. 5 shows an image of a microscope slide showing stained regions and a stained tissue sample;

FIG. 6 shows a tone curve adjusted for an under-stained condition; and,

FIG. 7 shows a tone curve adjusted for an over-stained condition.

DESCRIPTION OF PREFERRED EXAMPLES

In order to inspect biological tissue using known optical methods, the tissue firstly undergoes staining according to a given staining protocol. Typically combinations of stains are applied (according to the specific staining protocol) in order to enhance the colour contrast between different tissue elements.

As an example, firstly, a thin section is removed from a paraffin block, the section bearing an embedded tissue sample of interest. This section, which is a few micrometres thick, is floated on water and then placed on a microscope slide (see FIG. 1a). The slide is carefully dried and then subjected to a chemical process to remove the surrounding paraffin. Thereafter the slide is placed, together with a number of other such slides, into a slide holder (FIG. 1b). The selected staining protocol is then applied by immersing the slide holder in a number of different baths of liquid according to a predetermined sequence. Some of the baths contain different stains at given concentrations, others contain washing and other process chemicals. The slides are immersed in each bath for a respective predetermined period, this being illustrated in FIG. 1c. Finally the stained tissue is surrounded with resin and a coverslip is added to each slide (FIG. 1d) in order to preserve it and prepare it for imaging with a microscope imaging system.

FIG. 2 shows example images at three different magnifications, where the tissue is stained with haematoxylin and eosin (commonly known as H&E staining). A low magnification image on the left of FIG. 2 shows the stained tissue in question positioned upon a microscope slide. An area "A" of the stained sample is magnified in the central image in FIG. 2. Within this, a further area B is magnified in the image to the right of FIG. 2. In the magnified area B, the cell nuclei are stained strongly, this staining being produced mainly by haematoxylin with a small percentage of eosin. The more lightly stained surrounding elements are stained primarily by eosin with a small amount of haematoxylin. Other levels or staining are produced by differing mixes of the two stains. Example regions are indicated in FIG. 2. As will be appreciated, in practice these different levels of staining are actually represented by different colours, these originating from the two different stains. The different colouration of the tissue allows a pathologist to inspect the tissue using a microscope imaging system so as to obtain information about the structure of the tissue including the presence of abnormalities or disease.

The present invention uses the concept of applying one or more control regions of a substrate to the slide prior to the slide undergoing the staining in the baths. An example method to achieve this is now described, as shown with reference to the flow diagram of FIG. 3.

Initially at step 100 of the example method a glass microscope slide 10 is obtained such as a typical 25 mm by 75 mm slide. A number of regions 11 of tissue analogue material are then applied to the slide at step 110. This is illustrated in FIG. 4. The function of the tissue analogue material is to provide a substrate which acts as an analogue to biological tissue and becomes stained in a similar manner to a tissue sample when subjected to a staining protocol. A number of regions are provided in the present case since each region has a different thickness. It is important that, within a particular region, all parts of the region are of a similar thickness, thereby providing for a similar response to the staining chemical(s). The thicknesses of the different regions may be within a range such as 5 to 30 micrometres.

The regions 11 in the present example are each formed from sections of regenerated cellulose film which conveniently meets the desired constant thickness criterion. The adhesion of the cellulose film regions to the slide may be achieved using a suitable glue. In the present example three regions are provided illustrated at 11 in FIG. 4. FIG. 4 also shows the approximate location of the tissue sample 12 which will be applied to the slide later in the method.

Returning to the flow diagram of FIG. 3, at step 120, a biological sample is separately obtained and stabilised within a paraffin matrix. A microtome is then used at step 130 to remove a thin section of the tissue-bearing paraffin matrix. This is floated on water and applied to the microscope slide 10 at step 140. The slide is then dried and the part of the slide bearing the tissue sample 12 is then subjected to a chemical process to remove the paraffin at step 150.

At step 160 the entire slide, crucially including the regions 11 in addition to the tissue sample 12, is then subjected to the staining protocol, by applying the slide to various baths according to a timed sequence as mentioned earlier. The immersion periods in each bath typically lie in the range of 10 seconds to 30 minutes. In the present case the staining protocol used is haematoxylin and eosin (H&E) staining.

Following staining the tissue is stabilised and a cover slip is applied to the tissue sample 12 and the regions 11 at step 170. The slide is now a stain assessment target ready for visual assessment or use in assessing a biological imaging system.

FIG. 5 shows a schematic illustration of the resultant target comprising slide 10 with stained regions 11 and tissue sample 12. Most notably the three regions 11 have been stained to a different degree due to their different thicknesses. The thickest region 11 will exhibit the strongest discoloration.

Returning to FIG. 3, in a later imaging step 180, colour measurements are taken from the slide or the slide is imaged by a digital microscope, typically using red, green and blue images. The measurements are taken from each of the regions 11 together with the region 12.

The image data are then processed at step 190. In particular a relationship may be established between the spectral data, the substrate type and thickness of regions 11. This allows for images of tissue prepared using different sample preparation techniques and imaged using different imaging systems to be more readily compared by pathologists.

In a second example of the preparation of a microscope slide bearing regions of material to be stained alongside a tissue sample, whilst a number of different regions are provided, each is of a similar thickness. In this case, whilst a film is used, each side of the film is provided with a coating having a different composition or thickness. This coating provides for different absorbance characteristics of the film. Thus, during the application of the staining protocol at step 160 in FIG. 3, it is the coatings that control the diffusion of the stain into the substrate and therefore ultimately the degree of coloration of the regions.

In a third example, a different technique is used to provide the substrate of the regions 11. In this case rather than adhering a film to the glass slide, a printing technique is used. In particular a fluid-jet technique is used to scan across a region 11 and deposit a carefully controlled evenly printed layer of tissue analogue material, such as cellulose. A further benefit of this technique is that the deposited material may be overprinted so as to increase the thickness of the material. By simply repeating the printing process an integer number of additional times, integer layer thicknesses of material may be produced.

In summary therefore, a set of control regions, each having a different but carefully controlled thickness or stain absorbance characteristics of substrate material, is attached to the microscope slide at a convenient location before the slide is stained. The application of the substrate may be before or after the tissue section is applied to the slide. In the case of a film substrate it is preferred that the substrate is attached to the slide using the same glue as is used to attach the coverslip but it is recognised that equally effective methods may be used.

Since the thickness (or stain absorbance characteristics) of the tissue analogue material (substrate) is the same for all slides, the resulting colour provides an indication of the strength of stains applied to the slide. For each staining protocol, a control slide that has a standard level of staining applied may be produced and the colour of each of the control regions may be measured and held as a reference against which future staining may be compared.

This information may be used in the following ways:
  (a) to reject slides that are under- or over-stained;
  (b) to adjust the digital microscope capture to optimise the image of the tissue sample;
  (c) to adjust the viewer software to ensure that an optimal image is displayed and,
  (d) to provide guidance for automated image analysis software.

With reference to the adjusting of the digital microscope capture, it is common practice to capture images with 8-bits per colour for each of red, green and blue. This means that 255 levels can be captured for each colour channel and it is important to ensure that these represent the most important image colours. In most cases the image sensors can capture 10 bits of data per channel or more and some of this data must be discarded when the image is saved. Knowing the level of staining provides important input that allows the image capture system to be optimised by adjustment of the image data.

FIG. 6 shows an adjustment applied to the tone curve where the regions 11 indicate that the sample is "understained". FIG. 7 shows how the image levels may be adjusted when the regions indicate an over-staining condition.

In a similar way a tone curve may be applied when images are displayed. This tone curve may be adjusted to ensure that the optimal set of tones for each colour channel is displayed. This improves the probability that a pathologist will interpret the information correctly.

One benefit of digital microscopes is that they provide opportunities for automated image analysis software that may be used to guide pathologists in their review of slides, for example by performing "triage" of a set of slides. This involves highlighting areas likely to be of most interest to the pathologist or even diagnosing disease conditions directly. For these image processing algorithms to operate effectively it is important to be able to determine the staining level accurately. The staining of the tissue analogue regions may be used effectively to provide this information.

The invention claimed is:

1. A method of forming a stain assessment target for a biological material staining system, the method comprising:
   (a) providing a plurality of regions of a substrate, each region having a different predetermined physical thickness relative to each other region, upon a support, the substrate being formed from an optically transmissive material which is a non-tissue analogue of biological tissue, the substrate being devoid of biological tissue stain;
   (b) providing a biological diagnostic tissue sample upon the support; and,
   (c) applying, after step (a) and step (b), to the entire support, at least one biological tissue stain to each of the regions each having the different predetermined physical thickness formed from the non-tissue analogue of biological tissue and to the biological diagnostic tissue sample under similar staining conditions, such that the regions are stained to a different degree relative to each other due to their different predetermined physical thicknesses;
   wherein the physical thickness of at least one of said regions of the substrate is different from the physical thickness of said biological diagnostic tissue sample upon the support.

2. The method according to claim 1, wherein the application of the at least one biological tissue stain is achieved under similar staining conditions by immersing the support, including each of the regions and the biological tissue sample, in a bath of biological tissue stain.

3. The method according to claim 1, wherein the similar staining conditions include applying a predetermined concentration of biological stain material to each of the regions and the biological tissue sample, for a predetermined period.

4. The method according to claim 1, wherein the regions of substrate are provided in the form of respective pieces of film.

5. The method according to claim 1, wherein each region is deposited on to the support using a fluid-jet printing process.

6. The method according to claim 1, wherein a range of physical thicknesses is provided and wherein the physical thickness of the tissue sample lies within said range.

7. The method according to claim 1, wherein each region has a different stain absorption characteristic.

8. The method according to claim 1, wherein the step of applying at least one biological tissue stain is performed by immersing each of the regions and the biological tissue sample in a number of baths for a predetermined period according to a sequence.

9. The method according to claim 1, wherein the substrate is formed from a material selected from the group consisting of: cellophane, cellulose, agar, agarose and gelatine.

10. The method according to claim 9, wherein the substrate is formed from cellulose.

11. The method according to claim 1, wherein one of the following staining protocols is used: Haematoxylin and Eosin (H&E), Diaminobenzidine (DAB) with Haematoxylin counter stain, Papanicolaou (PAP), Perls' Prussian blue, Periodic acid-Schiff (PAS), Reticulin, Millers elastic Van Gieson, Shikata, Giemsa stain, Ziehl Neelsen technique, Grocott, Alcian blue PAS, Jones methenamine silver, Gram, Congo red stain for amyloid and Masson trichrome.

12. The method according to claim 1, wherein the predetermined physical thickness of each of said regions is within the range of 5 to 30 micrometers.

13. The method according to claim 12, wherein the predetermined physical thickness of one of said regions is 30 micrometers.

14. The method according to claim 1, wherein the biological diagnostic tissue sample is an histopathology biological diagnostic sample.

15. The method according to claim 1, wherein the different predetermined physical thickness is a different predetermined physical film thickness.

16. A method of forming a stain assessment target for a biological material staining system, the method comprising:
   (a) providing a plurality of regions of a substrate, each region having a different predetermined physical thickness relative to each other region, upon a support, the substrate being formed from an optically transmissive material which is a non-tissue analogue of biological tissue, the substrate being devoid of biological tissue stain, wherein said plurality of regions are deposited on to the support using a fluid-jet printing process;
   (b) providing a biological diagnostic tissue sample upon the support; and,
   (c) applying after step a) and step b) to the entire support, at least one biological tissue stain to each of the regions each having the different predetermined physical thickness formed from the non-tissue analogue of biological tissue and to the biological diagnostic tissue sample under similar staining conditions, such that the regions are stained to a different degree relative to each other due to their different predetermined physical thickness,
   wherein the physical thickness of at least one of said regions of the substrate is different from the physical thickness of said biological diagnostic tissue sample upon the support.

17. A method of forming a stain assessment target for a biological material staining system, the method comprising:
   (a) providing a plurality of regions of a substrate, each region having a different predetermined physical thickness relative to each other region, within the range of 5 to 30 micrometers, upon a support, the substrate being formed from an optically transmissive material which is a non-tissue analogue of biological tissue, the substrate being devoid of biological tissue stain;

(b) providing a biological diagnostic tissue sample upon the support; and, (c) applying after step a) and step b), to the entire support by immersion, at least one biological tissue stain to each of the regions each having the different predetermined physical thickness formed from the non-tissue analogue of biological tissue and to the biological diagnostic tissue sample under the same staining conditions, such that the regions are stained to a different degree relative to each other due to their different predetermined physical thickness, wherein the physical thickness of at least one of said regions of the substrate is different from the physical thickness of said biological diagnostic tissue sample upon the support.

* * * * *